US012703093B2

(12) United States Patent
Doi

(10) Patent No.: US 12,703,093 B2
(45) Date of Patent: Aug. 11, 2026

(54) HOLD POSITION DETERMINATION DEVICE AND HOLD POSITION DETERMINATION METHOD

(71) Applicant: KYOCERA Corporation, Kyoto (JP)

(72) Inventor: Ryota Doi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 232 days.

(21) Appl. No.: 18/565,064

(22) PCT Filed: May 27, 2022

(86) PCT No.: PCT/JP2022/021812
§ 371 (c)(1),
(2) Date: Nov. 28, 2023

(87) PCT Pub. No.: WO2022/250152
PCT Pub. Date: Dec. 1, 2022

(65) Prior Publication Data

US 2024/0269845 A1 Aug. 15, 2024

(30) Foreign Application Priority Data

May 28, 2021 (JP) ................................ 2021-090521

(51) Int. Cl.
*B25J 9/16* (2006.01)

(52) U.S. Cl.
CPC .......... *B25J 9/1664* (2013.01); *B25J 9/1605* (2013.01)

(58) Field of Classification Search
CPC ...... B25J 9/1664; B25J 9/1605; B25J 9/1612; B25J 9/1697; B25J 15/08; B25J 19/023;
(Continued)

(56) References Cited

U.S. PATENT DOCUMENTS 11,034,018 B2 6/2021 Kusano et al.
11,518,625 B2 12/2022 Komoda et al.
(Continued)

FOREIGN PATENT DOCUMENTS

CN 109986560 A 7/2019
CN 113084777 A * 7/2021 ............. B25J 5/007
(Continued)

OTHER PUBLICATIONS

CN-116079723-A translation (Year: 2023).*
(Continued)

*Primary Examiner* — Kyle T Johnson
(74) *Attorney, Agent, or Firm* — Procopio, Cory, Hargreaves & Savitch LLP

(57) ABSTRACT

A holding position determination device includes a control unit that determines the position where an end effector adapted to hold a holding target contacts the holding target as a holding position. The control unit acquires an end effector model that identifies an area where a holding portion of the end effector can exist. The control unit acquires a rule map that includes a map defining the position of the holding target to be held by the end effector based on an image of holding target obtained by photographing the holding target. The control unit determines the holding position based on the end effector model and the rule map.

19 Claims, 16 Drawing Sheets

(58) Field of Classification Search
CPC ........... G05B 2219/37555; G05B 2219/39476; G05B 2219/39543
See application file for complete search history.

(56) References Cited

U.S. PATENT DOCUMENTS

| | | | | |
|---|---|---|---|---|
| 11,565,407 | B2 | 1/2023 | Kusano et al. | |
| 2007/0152619 | A1* | 7/2007 | Sugiyama | B25J 9/1612 700/245 |
| 2009/0025502 | A1* | 1/2009 | Nakamoto | B25J 15/0009 901/31 |
| 2014/0074288 | A1 | 3/2014 | Satou | |
| 2014/0371871 | A1* | 12/2014 | Farina | A61F 2/54 623/24 |
| 2015/0283704 | A1* | 10/2015 | Watanabe | B25J 9/1612 700/262 |
| 2018/0283019 | A1* | 10/2018 | Telleria | B05D 3/0413 |
| 2019/0143507 | A1* | 5/2019 | Nishina | B25J 9/1669 700/245 |
| 2020/0061804 | A1* | 2/2020 | Bludau | B25J 9/0081 |
| 2020/0094406 | A1* | 3/2020 | Kusano | B25J 9/1669 |
| 2020/0234208 | A1* | 7/2020 | Childress | H04L 63/102 |
| 2020/0262064 | A1 | 8/2020 | Claussen et al. | |
| 2020/0324409 | A1* | 10/2020 | Gonzalez Aguirre | B25J 9/1661 |
| 2021/0053216 | A1* | 2/2021 | Diankov | B25J 9/1669 |
| 2021/0078811 | A1* | 3/2021 | Komoda | B25J 15/0052 |
| 2021/0187750 | A1* | 6/2021 | Holmes | B25J 9/1697 |
| 2022/0016766 | A1* | 1/2022 | Humayun | G06T 7/73 |
| 2022/0288783 | A1* | 9/2022 | Sundermeyer | B25J 9/1669 |
| 2022/0379474 | A1* | 12/2022 | Vu | G06T 17/10 |
| 2022/0395981 | A1* | 12/2022 | Xu | B25J 9/1697 |
| 2023/0405820 | A1* | 12/2023 | Huang | B25J 9/163 |
| 2024/0269845 | A1* | 8/2024 | Doi | B25J 19/023 |
| 2024/0342905 | A1* | 10/2024 | Doi | B25J 9/1612 |
| 2025/0065501 | A1* | 2/2025 | Doi | B25J 13/08 |
| 2025/0083315 | A1* | 3/2025 | Ding | B25J 9/1638 |
| 2025/0205890 | A1* | 6/2025 | Kabutan | B25J 9/1664 |
| 2025/0353173 | A1* | 11/2025 | Noda | B25J 9/161 |

FOREIGN PATENT DOCUMENTS

| | | | | | |
|---|---|---|---|---|---|
| CN | 114102575 | A | * | 3/2022 | B25J 9/161 |
| CN | 116079723 | A | * | 5/2023 | B25J 9/163 |
| CN | 117681211 | A | * | 3/2024 | B25J 9/1697 |
| EP | 4101604 | A1 | * | 12/2022 | B25J 9/1692 |
| JP | 2018-205929 | A | | 12/2018 | |
| JP | 2021-041513 | A | | 3/2021 | |
| WO | WO-2020255410 | A1 | * | 12/2020 | B25J 13/08 |

OTHER PUBLICATIONS

WO-2020255410-A1 translation (Year: 2020).*

CN-113084777-A translation (Year: 2021).*

CN-114102575-A translation (Year: 2022).*

CN-117681211-A translation (Year: 2024).*

Construction_of_Bin-Picking_System_for_Logistic_Application_A_Hybrid_Robotic_Gripper (Year: 2025).*

Roa et al., "Graspability Map: A Tool for Evaluating Grasp Capabilities", 2011 IEEE/RSJ International Conference on Intelligent Robots and Systems, Sep. 25-30, 2011. San Francisco, CA, USA, 978-1-61284-456-5 /11 /$26.00 © 2011 IEEE, pp. 1768-1774.

* cited by examiner 40
44
72a
70
42
72b

HOLD POSITION DETERMINATION DEVICE AND HOLD POSITION DETERMINATION METHOD

CROSS-REFERENCE TO RELATED APPLICATIONS

This application claims priority of Japanese Patent Application No. 2021-90521 filed in Japan on May 28, 2021, the entire disclosure of which being incorporated herein by reference.

TECHNICAL FIELD

The present disclosure relates to a holding position determination device and a holding position determination method.

BACKGROUND OF INVENTION

Conventionally, a known learning device learns to appropriately determine the position and posture of grasping an object from an image on a computer (see, for example, Patent Literature 1).

CITATION LIST

Patent Literature

Patent Literature 1: Japanese Unexamined Patent Application Publication No. 2018-205929

SUMMARY

A holding position determination device according to an embodiment of the present disclosure includes a control unit that determines the position where an end effector adapted to hold a holding target contacts the holding target as a holding position. The control unit acquires an end effector model that identifies an area where a holding portion of the end effector can exist. The control unit acquires a rule map that includes a map defining the position of the holding target to be held by the end effector based on an image of holding target obtained by photographing the holding target. The control unit determines the holding position based on the end effector model and the rule map.

A holding position determination method according to an embodiment of the present disclosure is performed by a holding position determination device that determines the position where an end effector adapted to hold a holding target contacts the holding target as a holding position. The holding position determination method includes acquiring, by the holding position determination device, an end effector model that identifies an area where a holding portion of the end effector can exist. The holding position determination method includes acquiring, by the holding position determination device, a rule map that includes a map defining the position of the holding target to be held by the end effector based on an image of holding target obtained by photographing the holding target. The holding position determination method includes determining, by the holding position determination device, the holding position based on the end effector model and the rule map.

DESCRIPTION OF EMBODIMENTS

In the case of learning the holding position of an object, a large amount of teacher data is needed to ensure that the holding position of the object is in line with human intention. This increases the workload or cost to prepare the large amounts of teacher data. According to a holding position determination device and a holding position determination method of an embodiment of the present disclosure, the holding position of the object can be simply positioned in line with human intention.

(Configuration Example of Robot Control System 100)

Figure 1:
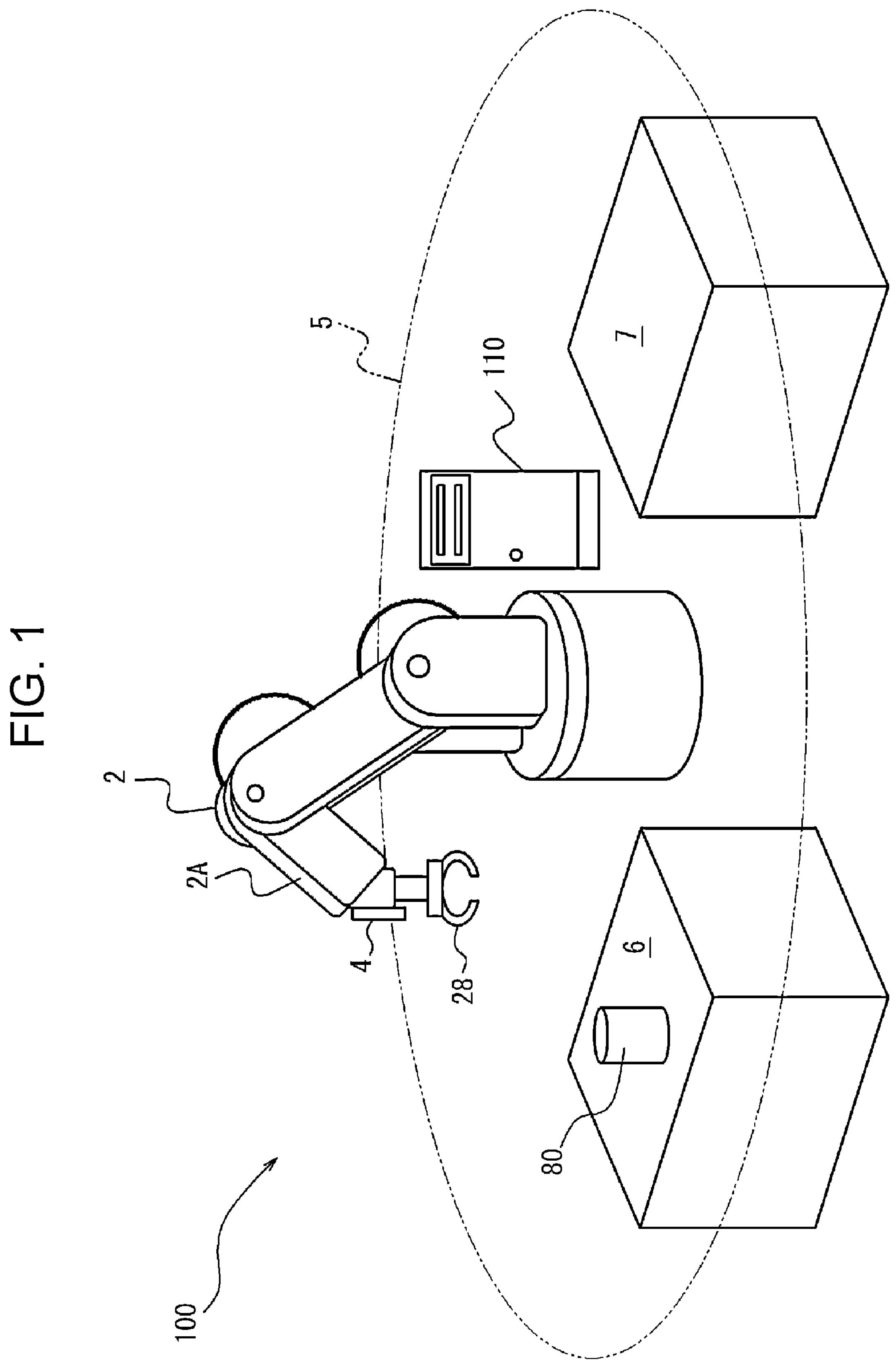
FIG. 1 is a schematic view illustrating a configuration example of a robot control system according to an embodiment.
Figure 2:
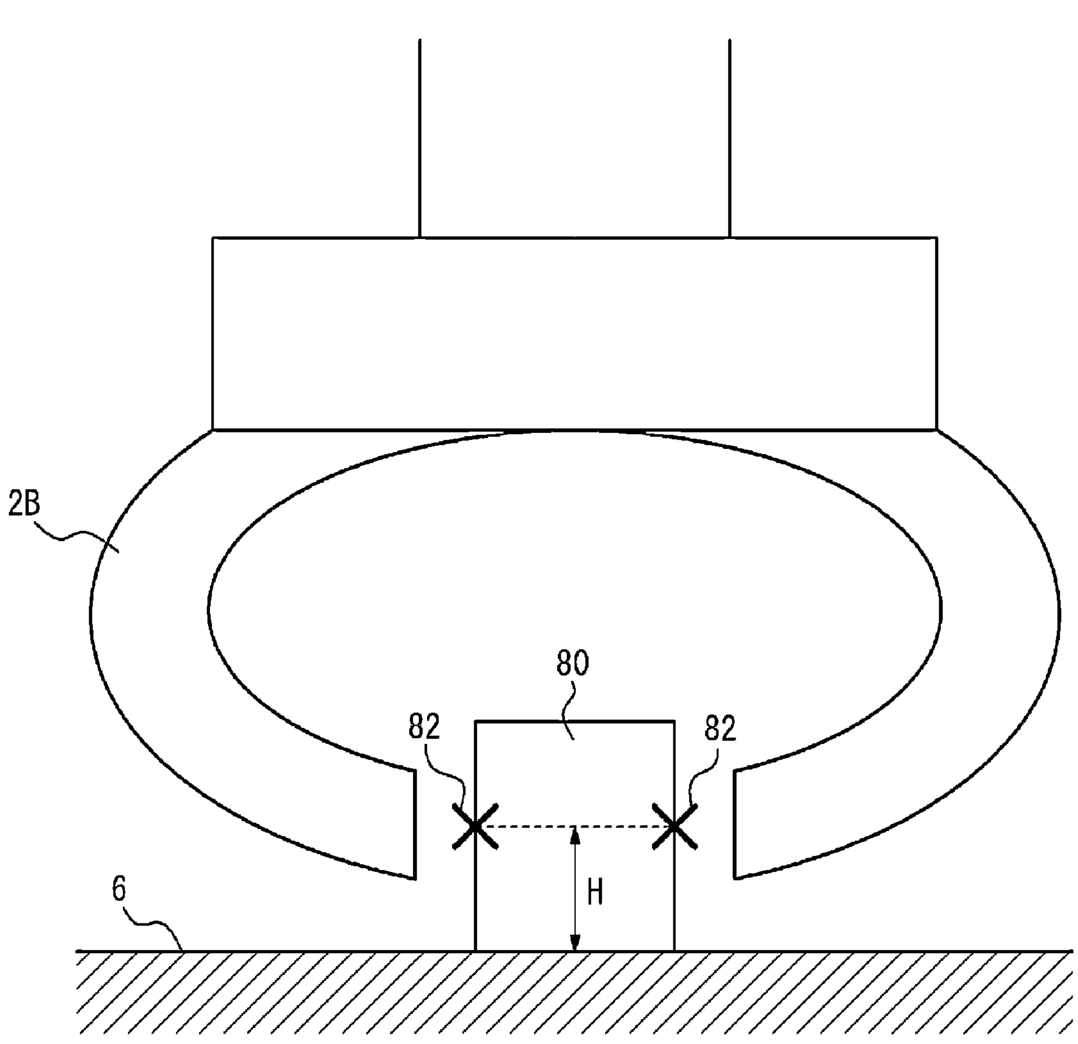
FIG. 2 is a side view illustrating an example of holding a holding target by an end effector.
Figure 3:
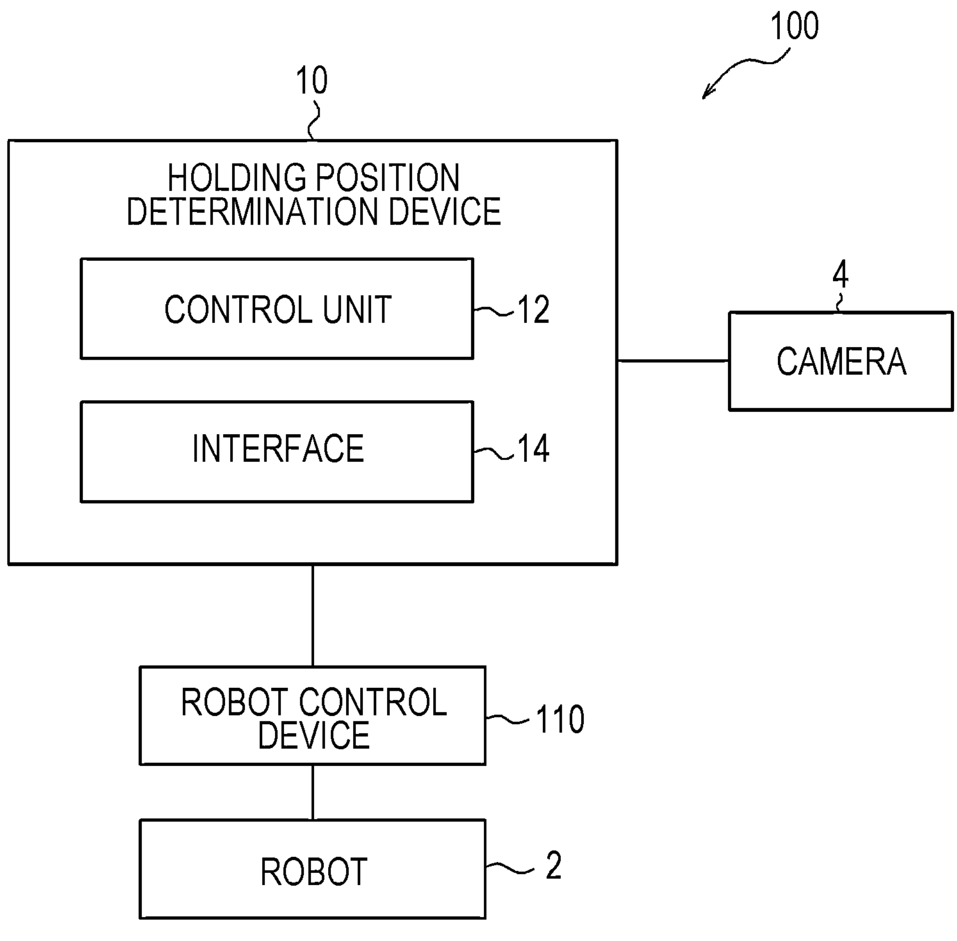
FIG. 3 is a block diagram illustrating a configuration example of the robot control system according to the embodiment.

As illustrated in FIGS. 1, 2, and 3, a robot control system 100 in accordance with an embodiment of the present disclosure includes a robot 2, a camera 4, a robot control device 110, and a holding position determination device 10. The robot 2 performs a work by holding a holding target 80 with an end effector 2B. The robot control device 110 controls the robot 2. The holding position determination device 10 determines the position where the robot 2 contacts the holding target 80 when holding the holding target 80 as a holding position, and outputs the determined position to the robot control device 110.

In the present embodiment, the robot 2 holds the holding target 80 at a work start platform 6. In other words, the robot control device 110 controls the robot 2 to hold the holding target 80 at the work start platform 6. The robot 2 may move the holding target 80 from the work start platform 6 to a work target platform 7. The holding target 80 is also referred to as a work target. The robot 2 operates inside a movement range 5.

<Robot 2>

The robot 2 includes an arm 2A and the end effector 2B. The arm 2A may be configured, for example, as a 6-axis or 7-axis vertically articulated robot. The arm 2A may also be configured as a 3-axis or 4-axis horizontal articulated robot or a SCARA robot. The arm 2A may also be configured as a 2-axis or 3-axis Cartesian coordinate robot. The arm 2A may also be configured as a parallel link robot or the like. The number of the axes constituting the arm 2A is not limited to those shown in the above examples. In other words, the robot 2 has the arm 2A connected by a plurality of joints, and is operated by driving the joints.

The end effector 2B may include, for example, a gripper configured to be able to hold the holding target 80. The gripper may include at least one finger. The finger of the gripper may include one or more joints. The finger of the gripper may include a suction portion that holds the holding target 80 by suction. The end effector 2B may be configured as one finger with the suction portion. The end effector 2B may also be configured as two or more fingers that grasp and hold the holding target 80. The end effector 2B may include a scooping hand configured to be able to scoop up the holding target 80. The end effector 2B is not limited to these examples and may be configured to perform various other operations. In the configuration illustrated in FIG. 1, the end effector 2B includes a gripper. The portion of the end effector 2B that holds the holding target 80 is also referred to as a holding portion. The holding portion of the end effector 2B may include a portion that contacts the holding target 80.

The robot 2 can control the position of the end effector 2B by moving the arm 2A. The end effector 2B may have an axis as a reference of the direction of the action with respect to the holding target 80. If the end effector 2B has the axis, the robot 2 can control the direction of the axis of the end effector 2B by moving the arm 2A. The robot 2 controls the start and end of the operation of the end effector 2B acting on the holding target 80. The robot 2 can move or process the holding target 80 by controlling the operation of the end effector 2B while controlling the position of the end effector 2B or the direction of the axis of the end effector 2B. In the configuration illustrated in FIG. 1, the robot 2 causes the end effector 2B to hold the holding target 80 at the work start platform 6, and moves the end effector 2B to the work target platform 7. The robot 2 causes the end effector 2B to release the holding target 80 at the work target platform 7. Thus, the robot 2 can move the holding target 80 from the work start platform 6 to the work target platform 7.

<Camera 4>

In the configuration example illustrated in FIG. 1, the robot control system 100 includes the camera 4 mounted on the end effector 2B of the robot 2. The camera 4 photographs the holding target 80 from the end effector 2B toward the holding target 80. In other words, the camera 4 photographs the holding target 80 from a direction in which the end effector 2B holds the holding target 80. The camera 4 may also be configured to photograph the holding target 80 from other directions. The image obtained by photographing the holding target 80 from other directions may be converted to the image obtained by photographing the holding target 80 from the direction in which the end effector 2B holds the holding target 80. The image obtained by photographing the holding target 80 is also referred to as an image of holding target. The camera 4 includes a depth sensor and is configured to be able to acquire depth data of the holding target 80. The image photographed by the camera 4 may contain monochrome brightness information, or may contain brightness information of each color represented by RGB (Red, Green and Blue) and the like. The number of the cameras 4 is not limited to one, but may be two or more. The camera 4 may also photograph other objects located within a predetermined range from the holding target 80 as obstacles and acquire depth data of the obstacles.

<Holding Position Determination Device 10>

As illustrated in FIG. 3, the holding position determination device 10 includes a control unit 12 and an interface 14. The interface 14 acquires information or data about the holding target 80 and the like from external devices and outputs information or data to the external devices. The interface 14 also acquires the image obtained by photographing the holding target 80 from the camera 4. The interface 14 may receive input from the user. The interface 14 may output information or data to be recognized by the user. The control unit 12 determines the position at which the robot 2 holds the holding target 80 based on the information or data obtained at the interface 14 and outputs the determined position to the interface 14. The position at which the robot 2 holds the holding target 80 is also referred to simply as the holding position.

The control unit 12 may include at least one processor to provide control and processing capacity to perform various functions. The processor may execute programs that implement the various functions of the control unit 12. The processor may be realized as a single integrated circuit. The integrated circuit is also referred to as an IC. The processor may also be realized as a plurality of communicably connected integrated circuits and discrete circuits. The processor may also be realized based on various other known technologies.

The control unit 12 may include a storage section. The storage section may include an electromagnetic storage media such as a magnetic disk or the like, or may include a memory such as a semiconductor memory or a magnetic memory. The storage section stores various types of information. The storage section stores programs and the like to be executed by the control unit 12. The storage section may be configured as a non-transient readable medium. The storage section may function as a work memory of the control unit 12. At least part of the storage section may be configured separately from the control unit 12.

The interface 14 may include a communication device configured to be able to perform wired or wireless communication. The communication device may be configured to be able to communicate using communication methods based on various communication standards. The communication device can be configured with known communication technologies.

The interface 14 may include an input device that receives input of information, data or the like from the user. The input device may include, for example, a touch panel, a touch sensor, or a pointing device such as a mouse. The input device may include physical keys. The input device may include an audio input device such as a microphone.

The interface 14 includes an output device that outputs information, data and the like to the user. The output device may include, for example, a display device that outputs visual information such as images, text or graphics. The display device may include, for example, an LCD (liquid crystal display), an organic EL (electro-luminescence) display, an inorganic EL display, a PDP (plasma display panel), or the like. The display device is not limited to the above displays and may include other displays based on various other methods. The display device may include a light emitting device such as an LED (Light Emission Diode) or an LD (Laser Diode). The display device may include various other devices. The output device may include, for example, an audio output device such as a speaker that outputs auditory information such as voice. The output device is not limited to the above examples and may include various other devices.

<Robot Control Device 110>

The robot control device 110 acquires information for identifying the holding position from the holding position determination device 10 and controls the robot 2 so that the robot 2 holds the holding target 80 at the holding position determined by the holding position determination device 10.

The robot control device 110 may include at least one processor to provide control and processing capability to perform various functions. Each component of the robot control device 110 may include at least one processor. A plurality of components of the robot control device 110 may be realized by a single processor. The entire robot control device 110 may be implemented with a single processor. The processor can execute programs that implement various functions of the robot control device 110. The processor may be configured identical or similar to the processor used in the holding position determination device 10.

The robot control device 110 may include a storage section. The storage section may be configured identical or similar to the storage section used in the holding position determination device 10.

The robot control device 110 may include the holding position determination device 10. The robot control device 110 and the holding position determination device 10 may be configured as separate units.

(Examples of Operation of Robot Control System 100)

The robot control system 100 controls the robot 2 by the robot control device 110 to cause the robot 2 to perform a work. In the present embodiment, the work to be performed by the robot 2 includes an operation to hold the holding target 80. In the robot control system 100, the holding position determination device 10 determines the holding position of the holding target 80 to be held by the robot 2. The robot control device 110 controls the robot 2 so that the robot 2 holds the holding target 80 at the determined holding position.

In the case where the end effector 2B is a gripper, the control unit 12 determines the combination of positions where the fingers contact the holding target 80 when the gripper grasps the holding target 80 as the holding position. In the case where the end effector 2B includes a suction portion, the control unit 12 determines the position where the suction portion contacts the holding target 80 when the end effector 2B sucks the holding target 80 as the holding position.

Figure 4:
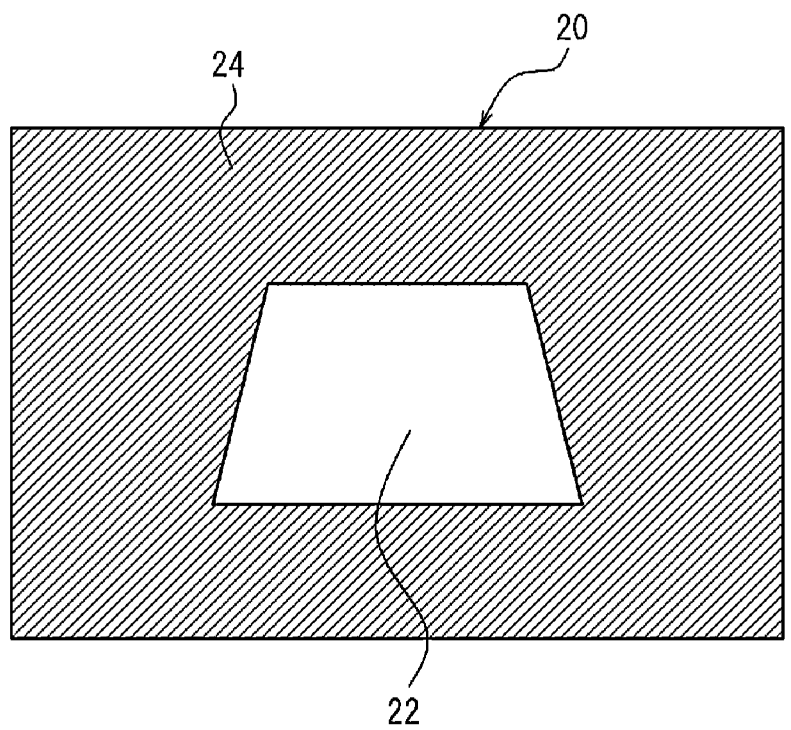
FIG. 4 is a view illustrating an example of a mask image representing the outline of the holding target in a plane in which the holding target is held.

The control unit 12 of the holding position determination device 10 acquires the image obtained by photographing the holding target 80 and the depth data of the holding target 80 from the camera 4. The control unit 12 recognizes the outline and position of the holding target 80 based on the image obtained by photographing the holding target 80 and the depth data of the holding target 80. The control unit 12 generates a mask image 20 representing the recognition result of the holding target 80 when viewing the holding target 80 from the camera 4 attached to the end effector 2B, as illustrated in FIG. 4. The mask image 20 includes a window 22 representing an area where the holding target 80 exists when viewed from the camera 4, and a mask 24 representing other areas. The window 22 is represented as a white painted area. The mask 24 is represented as a right ascending shaded hatched area. The area of the mask 24 in the mask image 20 is represented as a hatched area for convenience of drawing description, but may be represented as a black painted area in the actual implementation.

The control unit 12 acquires information about the end effector 2B. The information about the end effector 2B includes, for example, information identifying the maximum value of the interval between fingers that grasps objects, finger thickness and finger width, in the case where the end effector 2B is a gripper. The control unit 12 may generate an end effector model 30 based on the information about the end effector 2B. The control unit 12 may acquire the end effector model 30 that identifies the area where the holding portion of the end effector 2B can exist.

Figure 5A:
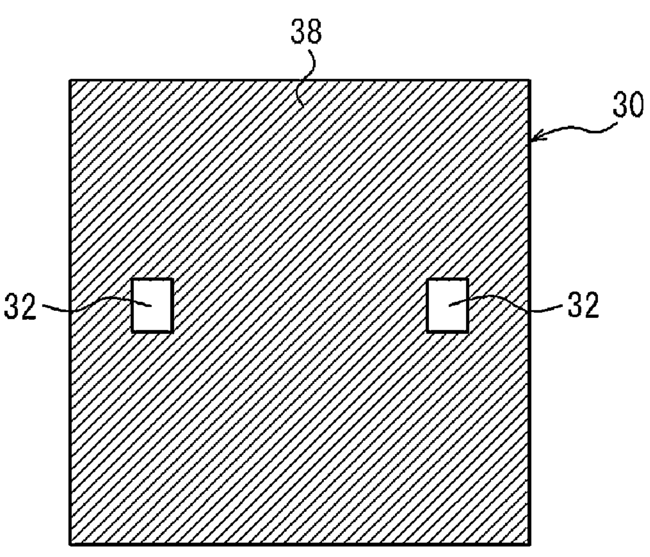
FIG. 5A is a view illustrating an example of a model, among end effector models, that represents the opening width of fingers.

The end effector model 30 includes a finger model that identifies a finger position 32, which represent a range where the fingers of the gripper are located at a predetermined interval, and an out-of-movement range 38, which represents a range outside the finger position 32, as illustrated in FIG. 5A. In other words, the finger model represents the opening width of the fingers of the gripper. The finger position 32 may represent a range where the fingers of the gripper are located at a maximum interval. In such a case, the finger model represents a maximum opening width of the fingers of the gripper. The finger model illustrated in FIG. 5A represents the maximum opening width of the fingers of the gripper. The finger position 32 is represented as a white painted area. The out-of-movement range 38 is represented as a right ascending shaded hatched area. The out-of-movement range 38 is represented as a hatched area for convenience of drawing description, but may be represented as a black painted area in the actual implementation.

Figure 5B:
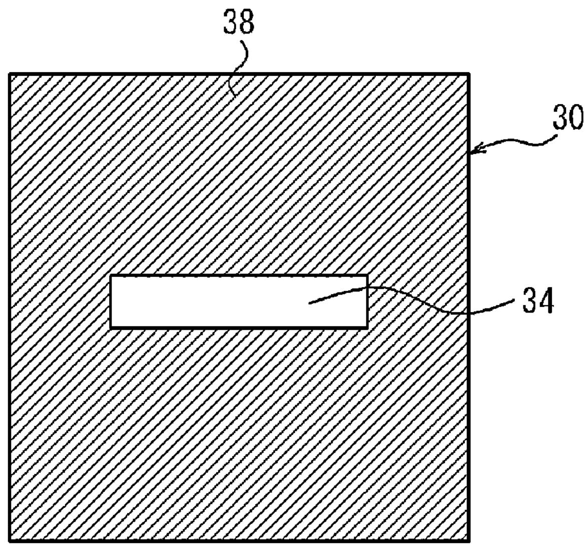
FIG. 5B is a view illustrating an example of a model, among the end effector models, that represents the stroke of the fingers.

The end effector model 30 includes a stroke model that identifies a stroke range 34, which represents a range in which the fingers of the gripper move, as illustrated in FIG. 5B. The stroke range 34 is represented as a white painted area.

Figure 5C:
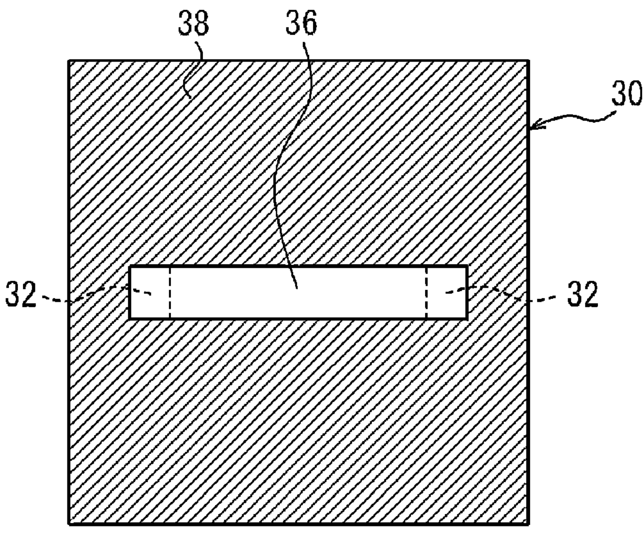
FIG. 5C is a view illustrating an example of an overall model, among the end effector models, that represents both the opening width and the stroke of the fingers.

The end effector model 30 includes an overall model, as illustrated in FIG. 5C, obtained by combining the finger model illustrated in FIG. 5A and the stroke model illustrated in FIG. 5B. The overall model identifies a finger movement range 36. The finger movement range 36 includes the finger position 32. In FIG. 5C, the finger portion of the gripper in the finger movement range 36 is distinguished by a dashed line, but in the actual implementation, it is not necessarily to be distinguished. In the present embodiment, the end effector model 30 represents a range where the fingers of the gripper are located at the maximum interval (the maximum opening width), but the end effector model 30 is not limited to such a range. The end effector model 30 may represent a range where the fingers of the gripper are located at an arbitrary interval (i.e., a predetermined interval). For example, the end effector model 30 may represent an interval between the fingers of the gripper corresponding to the size of the object to be grasped by the end effector 2B.

The control unit 12 may generate only the overall model as the end effector model 30. In such a case, the finger position 32 may be identified by associating information identifying the finger position 32 with the overall model. The information identifying the finger position 32 may include numerical values representing the feature points of the fingers.

In the case where the end effector 2B includes a suction portion, the end effector model 30 is configured as a model that defines a range in which the suction portion interferes with other objects when sucking the holding target 80.

The control unit 12 sets the height of the position at which the holding target 80 is held based on the depth data of the holding target 80. Specifically, as illustrated in FIG. 2, the control unit 12 sets a height from the work start platform 6 as the height of the position at which the holding target 80, which is disposed on the work start platform 6, is held. In FIG. 2, the position where the holding target 80 is grasped by being sandwiched between the fingers of the end effector 2B is represented as a holding point 82. The height of the position of the holding point 82 from the work start platform 6 is represented by H. In such a case, the control unit 12 sets H as the height of the position at which the holding target 80 is held. Based on the depth data of the holding target 80, the control unit 12 sets the height of the position at which the holding target 80 is held to a value smaller than the distance from the work start platform 6 to the highest point of the holding target 80. The control unit 12 may set the height of the position at which the holding target 80 is held to a value about half the height of the holding target 80.

The control unit 12 may generate the mask image 20 based on the height of the position at which the holding target 80 is held and the depth data of the holding target 80. Specifically, the control unit 12 may generate the mask image 20 with the window 22 as a cross-sectional shape of the holding target 80 obtained by cutting the holding target 80 by a plane at the height of the position at which the holding target 80 is held.

The control unit 12 acquires a rule map that identifies a rule for determining the holding position of the holding target 80. The rule map includes a map that defines a position of the holding target 80 to be used by the end effector 2B to hold the holding target 80. The rule map may include a map generated based on the height of the position at which the holding target 80 is held. The rule map may be generated based on the image of holding target. The rule map may be generated based on an image obtained by converting an image obtained by photographing the holding target 80 from a direction other than the direction in which the end effector 2B holds the holding target 80 into an image obtained by photographing the holding target 80 from the direction in which the end effector 2B holds the holding target 80. The rule map may be classified, for example, into a surrounding environment map 40 (see FIG. 6), an object map 50 (see FIG. 8A or 8B), a contact map 60 (see FIG. 9) and the like. The control unit 12 may generate the rule map. The control unit 12 may acquire the rule map based on at least one of shape data of the holding target 80 and depth data associated with the image of holding target. The rule map may be acquired for each height of the position at which the holding target 80 is held. The rule map may identify a rule by the display form of an image represented in a two-dimensional state.

Figure 6:
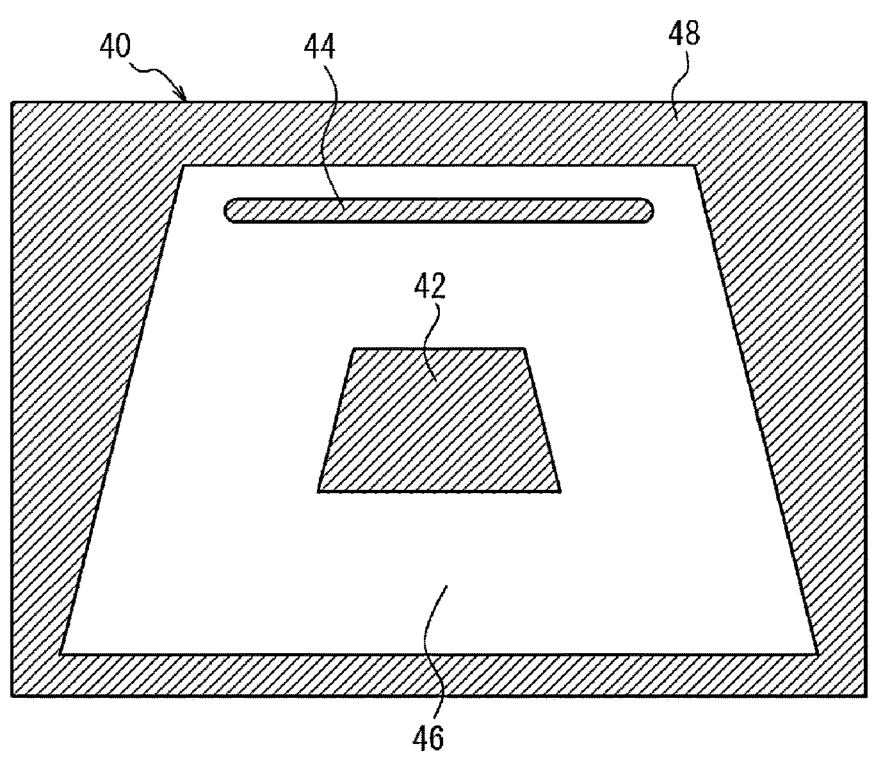
FIG. 6 is a view illustrating an example of a surrounding environment map.

The surrounding environment map 40 identifies an object area 42, an obstacle area 44, an approach area 46, and a non-approach area 48, as illustrated in FIG. 6. The object area 42 represents an area where the holding target 80 exists at the height of the position at which the holding target 80 is held. The obstacle area 44 represents an area where an obstacle that is an object other than the holding target 80 and that limits the movement of the end effector 2B exists, at the height of the position at which the holding target 80 is held. The approach area 46 represents a movement range obtained by combining the movement of the gripper itself as the end effector 2B and the movement of the fingers of the gripper. The object area 42, the obstacle area 44, and the non-approach area 48 represent ranges other than the approach area 46. The approach area 46 is represented as a white painted area. The object area 42, the obstacle area 44, and the non-approach area 48 are represented as right ascending shaded hatched areas. The object area 42, the obstacle area 44, and the non-approach area 48 are represented as hatched areas for convenience of drawing description, but may be represented as black painted areas in the actual implementation. The surrounding environment map 40 is configured as a map that defines a range in which the end effector 2B can move at the height of the position at which the holding target 80 is held.

The control unit 12 can generate the surrounding environment map 40 by generating the approach area 46 and the non-approach area 48 and disposing the object area 42 and the obstacle area 44 in the approach area 46. The approach area 46 is also referred to as a first area where the end effector 2B can exist. The non-approach area 48 is also referred to as a second area where the end effector 2B cannot exist. The second area is defined as at least the area where the holding target 80 exists and the surrounding area of the holding target 80. In the surrounding area of the holding target 80, the second area is assigned such that the proportion of the second area in the first area decreases as separating from the holding target 80.

Figure 7:
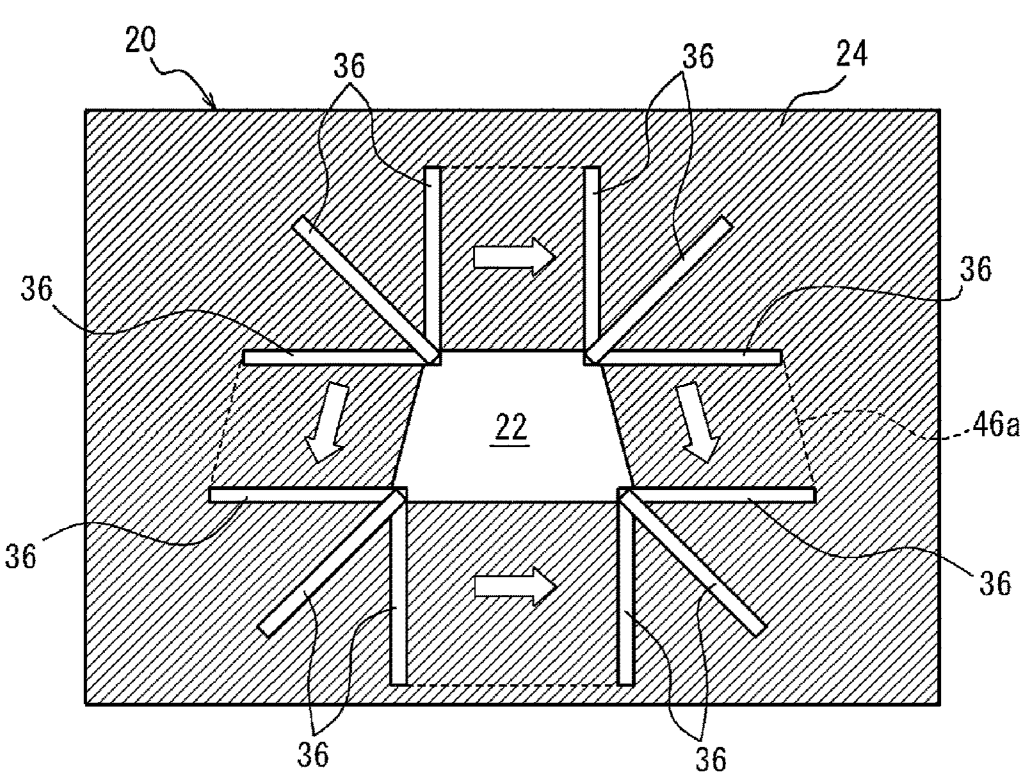
FIG. 7 is a view illustrating a method of generating an approach range for the surrounding environment map.

The control unit 12 can generate the approach area 46 based on the mask image 20. For example, FIG. 7 illustrates how the control unit 12 generates the approach area 46. The control unit 12 may perform convolution of the end effector model 30 on the mask image 20. The control unit 12 may move the finger movement range 36 so that at least a portion of the finger movement range 36 identified in the end effector model 30 overlaps the window 22 included in the mask image 20. In such a case, the rectangle representing the finger movement range 36 can be rotated and positioned at various angles so that at least part of the rectangle overlaps a point in the upper left corner of the window 22, for example. The control unit 12 generates, as the approach area 46, the area through which the finger movement range 36 passes when the finger movement range 36 is moved. In FIG. 7, when the finger movement range 36 moves, the trajectory drawn by the furthest point from the window 22 is represented as a boundary 46*a* of the approach area 46. The boundary 46*a* is represented by a dashed line.

The control unit 12 generates the object area 42 based on the depth data of the holding target 80 in the generated approach area 46. The control unit 12 generates an area where the holding target 80 exists at a position higher than the height of position at which the holding target 80 is held as the object area 42. Further, the control unit 12 disposes the obstacle area 44 in the generated approach area 46 based on the depth data of the obstacle. The control unit 12 generates an area where the obstacle exists at a position higher than the height of position at which the holding target 80 is held as the obstacle area 44.

The control unit 12 may perform a blurring process to blur the boundary on the generated surrounding environment map 40. Each area included in the surrounding environment map 40 generated by the procedure described above can be distinguished as a numerical value in each coordinate in the map. The control unit 12 may, for example, set 1 as the numerical value at a coordinate included in the approach area 46, indicating that the point identified by the coordinate is within the movement range of the end effector 2B. On the other hand, the control unit 12 may set 0 as the numerical value at a coordinate included in the object area 42, the obstacle area 44, and the non-approach area 48, indicating that the point identified by the coordinate is not within the movement range of the end effector 2B. The control unit 12 sets the numerical value at a coordinate that identifies a point within a predetermined range from the boundary between the area where 1 is set and the area where 0 is set to a value greater than 0 and less than 1, such as 0.5 for example. The control unit 12 performs such a process of blurring the boundary of the area as the blurring process.

Each area included in the surrounding environment map 40 generated by the procedure described above can be distinguished as a color in each coordinate in the map. The control unit 12 may, for example, represent the points in the approach area 46 in white and the points in other areas in black. The control unit 12 may represent the points within a predetermined range from the boundary between the area represented in white and the area represented in black in a grayscale. The control unit 12 may perform such a process of blurring the boundary of the area as the blurring process. Representing the color of each area as black, white or gray corresponds to representing the numerical value set for each area as a brightness value.

Owing to the blurring process performed the control unit 12, the possibility of unexpected collision of the end effector 2B with an object due to an error in the movement range of the end effector 2B or an error in the outline of the holding target 80 or obstacle can be reduced. In other words, owing to the blurring process, the control unit 12 can determine the position of the end effector 2B relative to the holding target 80, taking into account various margins. The blurring process may be performed in the peripheral portion of each area included in the generated surrounding environment map 40. Due to the blurring process, each area is enlarged.

The object map 50 represents information that is referenced to determine at which position of the holding target 80 the worker would hold the holding target 80 if he or she were to hold the holding target 80. The object map 50 represents information such as the shape, material or density distribution of the holding target 80, for example.

Figure 8A:
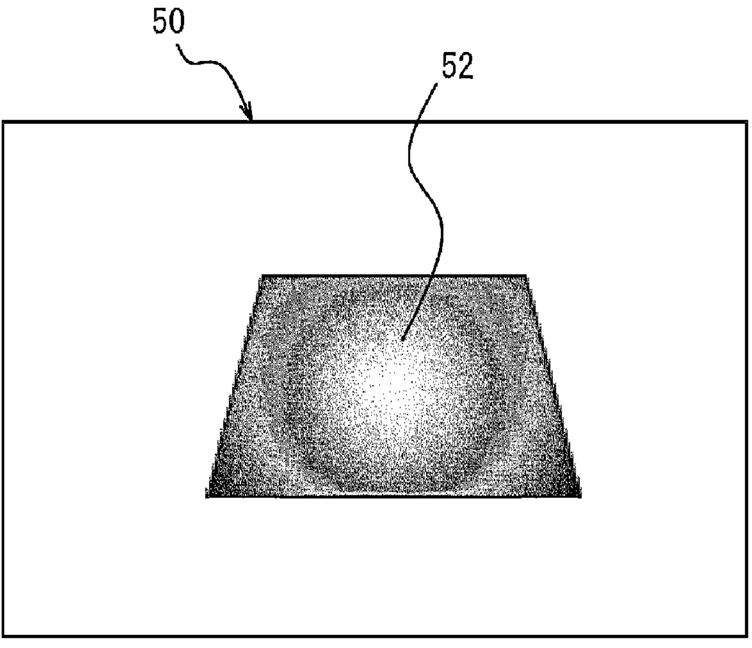
FIG. 8A is a view illustrating an example of an object map representing the center of the holding target.
Figure 8B:
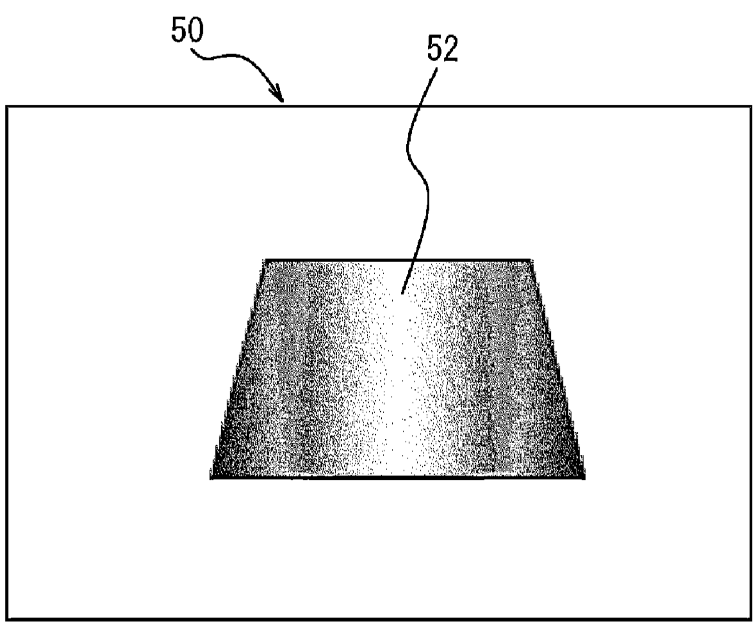
FIG. 8B is a view illustrating an example of an object map representing the priority of a holding position specified by the user.

For example, it is assumed that the closer to the center of the holding target 80, the more appropriate the holding position is for the rule. As illustrated in FIG. 8A, the object map 50 related to the holding target 80 such assumed may be represented, in a cross section 52 obtained by cutting the holding target 80 by a plane at the height of the position at which the holding target 80 is held, by a grayscale where a color closer to white represents that the closer to the center of the holding target 80, the more appropriate the holding position is for the rule, and a color closer to black represents that the further away from the center of the holding target 80, the less appropriate the holding position is for the rule. The object map 50 may be represented by a grayscale, as illustrated in FIG. 8B, which identifies a rule arbitrarily set by the user as a rule for determining the position to hold the holding target 80. As illustrated in FIG. 8B, when creating the object map 50 showing that the closer to the center of the holding target 80, the more appropriate the grasping position is, a color closer to white represents that the closer to the center along the horizontal direction of the cross section 52 of the holding target 80, the more appropriate the holding position is, and a color closer to black represents that the farther away from the center along the horizontal direction of the cross section 52 of the holding target 80, the less appropriate the holding position is. The object map 50 illustrated in FIG. 8B is represented by the same color along the height direction of the cross section 52.

In FIGS. 8A and 8B, the black solid line that surrounds the cross section 52 of the object map 50 simply represents the contour of the cross section 52 and does not represent the rule. The coordinate plotted by the black solid line does not represent an inappropriate holding position.

The object map 50 may be configured so that, when assuming a position to hold the holding target 80 and evaluating the appropriateness of holding the holding target 80 at the assumed position, an appropriate value representing the evaluation of appropriateness is increased by holding the object near the area represented by a color closer to white. The object map 50 may be represented by associating a numerical value with the color of each coordinate, as in the surrounding environment map 40. The control unit 12 may, for example, set 1 to the coordinates represented by white and set 0 to the coordinates represented by black.

The control unit 12 is not limited to the above example, but may generate the object map 50 with a colors or numerical value set for each coordinate so as to identify various rules. The control unit 12 may, for example, generate the object map 50 with a color or numerical value set for each coordinate according to the distance from the center of gravity of the holding target 80. The control unit 12 may, for example, generate the object map 50 with a color or numerical value set for each coordinate so as to identify positions to be avoided as the holding position or positions to be prohibited as the holding position.

The control unit 12 may generate one object map 50 that identifies a plurality of rules by mixing a plurality of object maps 50 that each identify one rule. When mixing the plurality of object maps 50, the control unit 12 may set a weighting coefficient for each object map 50 and mix the plurality of object maps 50 with set weighting coefficients. For example, if the center of gravity of the holding target 80 is important, the control unit 12 may set a larger weighting coefficient for the object map 50 that identifies the position of the center of gravity.

The object map 50 may be defined based on the properties possessed by the holding target 80 itself. The object map 50 may be defined based on any of the shape, material, texture, weight, and friction coefficient of the holding target 80. The object map 50 may be based on definitions arbitrarily made by the user for the holding position of the holding target 80. For example, some portions of the holding target 80 not to be used as the holding position for various reasons, such as the portions that are easily damaged or deformed by contact, the portions that are covered with grease and the portions that are slippery and therefore unsuitable for holding, can be defined in the object map 50 as a rule. Similarly, the portions that are difficult to break or deform, the portions that free of grease or other contaminants, the portions that are difficult to slip, and the portions to be used as the holding position based on empirical rules (the portions that are considered easy to hold) can be defined in the object map 50 as a rule. By representing the object map 50 as a two-dimensional image, it becomes easy to grasp what rule is defined for the holding position of the holding target 80. The object map 50 may be generated for each type of the holding target 80.

The contact map 60 represents a rule that is determined based on the relationship between the fingers of the end effector 2B and the surface conditions of the holding target 80. Similar to the object map 50, the contact map 60 represents information that is referenced to determine at what position of the holding target 80 the worker would hold the holding target 80 if he or she were to hold the holding target 80. The contact map 60 is defined based on the shape of the contact portion of the end effector 2B with the holding target 80 and the shape of the holding target 80. The contact map 60 represents the appropriateness as a position for the end effector 2B to contact the holding target 80. For example, the contact map 60 can define a portion to be the holding position or a portion not to be the holding position, based on the relationship between the shape or material of the contact portion of the end effector 2B with the holding target 80 and the shape or material of the holding position of the holding target 80. More specifically, the portions where the contact area between the end effector 2B and the holding target 80 becomes small, the portions where the friction coefficient of the friction between the end effector 2B and the holding target 80 is smaller than a predetermined value, or the portions that are considered difficult to be held by the end effector 2B to be used based on empirical rules, can be defined in the contact map 60 as a rule representing portions not to be used as the holding position. Similarly, the portions where the contact area between the end effector 2B and the holding target 80 becomes large, the portions where the friction coefficient of the friction between the end effector 2B and the holding target 80 is larger than a predetermined value, or the portions considered to be easy to be held by the end effector 2B to be used based on empirical rules, can be defined in the contact map 60 as a rule representing portions to be used as the holding position.

The contact map 60 represents, for example, the contact area between the surface of the holding target 80 and the fingers of the end effector 2B when the holding target 80 is held by the end effector 2B, or the friction force acting between the surface of the holding target 80 and the fingers of the end effector 2B. If the holding target 80 has an uneven surface, the contact area may vary significantly when the position of the fingers of the end effector 2B is slightly displaced.

Figure 9:
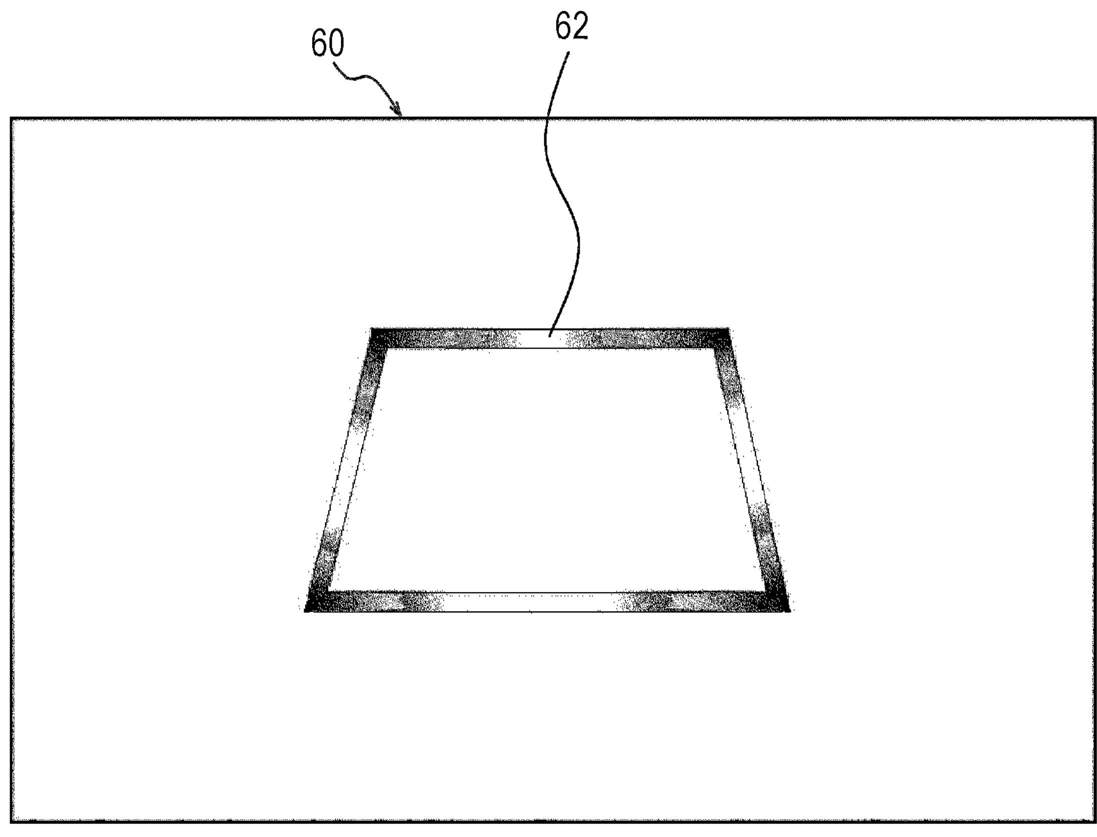
FIG. 9 is a view illustrating an example of a contact map.

As illustrated in FIG. 9, the contact map 60 may be represented, in an outer periphery 62 of a cross section obtained cutting the holding target 80 by a plane at the height of the position at which the holding target 80 is held, by a grayscale where a color closer to white represents that the closer to the center of each side, the more appropriate the holding position is, and a color closer to black represents that the further away from the center and closer to the corners, the less appropriate the holding position is. The contact map 60 illustrated in FIG. 9 shows that the contact area between the surface of the holding target 80 and the fingers of the end effector 2B is larger when holding the holding target 80 at a position near the center of each side and smaller when holding the holding target 80 at a position near the corners.

In FIG. 9, the black solid line that surrounds the outer periphery 62 of the contact map 60 simply represents the contour of the outer periphery 62. The coordinate plotted by the black solid line does not represent an inappropriate holding position.

The control unit 12 may generate one contact map 60 that identifies a plurality of rules by mixing a plurality of contact maps 60 that each identifies one rule. When mixing the plurality of contact maps 60, the control unit 12 may set a weighting coefficient for each contact map 60 and mix the plurality of contact maps 60 with set weighting coefficients. For example, if the contact area between the surface of the holding target 80 and the fingers of the end effector 2B is important, the control unit 12 may set a larger weighting coefficient for the contact map 60 that identifies the contact area.

The control unit 12 determines a position to hold the holding target 80 based on the generated rule map. Specifically, the control unit 12 projects the end effector model 30, as a temporary holding position, onto the rule map and calculates the coincidence degree at the projected position to thereby evaluate the appropriateness if actually holding the holding target 80 at the temporary holding position.

Figures 10, 11:
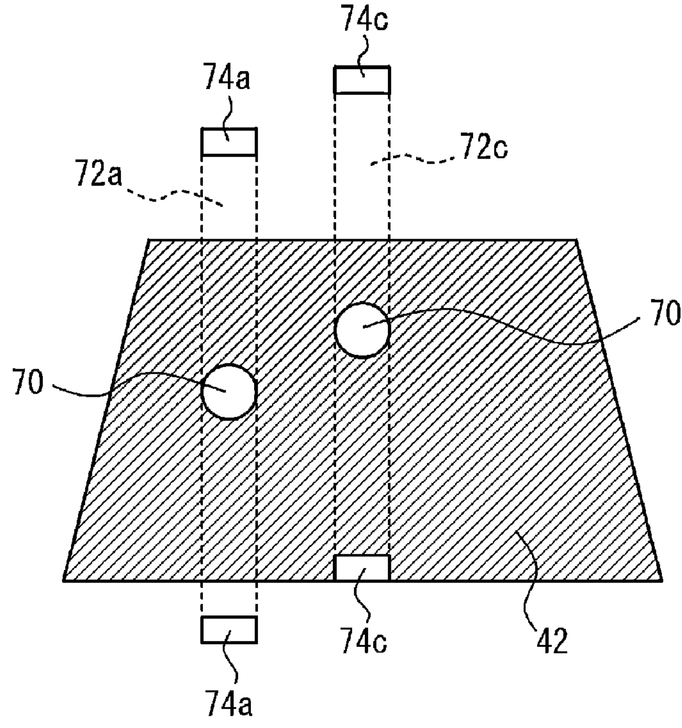
FIG. 10 is a view illustrating an example of a position where an end effector model is to be projected onto the surrounding environment map.
FIG. 11 is a view illustrating a position where an end effector model can be projected and a position where an end effector model cannot be projected onto the surrounding environment map.

The control unit 12 selects an arbitrary point within the window 22 of the mask image 20. The arbitrary point selected within the window 22 corresponds to an approach position 70 in the object area 42 in the surrounding environment map 40, as illustrated in FIG. 10. In other words, the control unit 12 sets an arbitrary point within the window 22 of the mask image 20 as the approach position 70. The control unit 12 projects the end effector model 30 so that the center of the end effector model 30 is aligned with the approach position 70. The projected end effector model 30 is represented as projection models 72*a* and 72*b* illustrated in FIG. 10. The projection model 72*a* corresponds to a model obtained by rotating the end effector model 30 along the short side direction of the object area 42. The projection model 72*b* corresponds to a model obtained by rotating the end effector model 30 by 45 degrees clockwise from the short side direction of the object area 42.

The control unit 12 assumes that the end effector model 30 cannot be projected if the finger position 32 included in the end effector model 30 overlaps the object area 42. As illustrated in FIG. 11, in the projection model 72*a*, a finger projection position 74*a* included in the projection model 72*a* does not overlap with the object area 42. Thus, the control unit 12 can project the projection model 72*a* onto the surrounding environment map 40. On the other hand, in a projection model 72*c*, a finger projection position 74*c* included in the projection model 72*c* overlaps with the object area 42. Therefore, the control unit 12 cannot project the projection model 72*c* onto the surrounding environment map 40. By not projecting the end effector model 30 when the finger position 32 overlaps with the object area 42, collision of the end effector 2B with the holding target 80 while the end effector 2B approaches the holding target 80 is avoided. The control unit 12 also assumes that the end effector model 30 cannot be projected if at least part of the end effector model 30 overlaps the obstacle area 44. Thus, collisions with obstacles are avoided when the end effector 2B holds the holding target 80.

If the finger position 32 is not identified in the end effector model 30, the control unit 12 determines whether the end effector model 30 can be projected based on the feature points of the fingers associated with the end effector model 30.

The position of the end effector 2B corresponding to the position and rotation angle of the end effector model 30, which can be projected onto the surrounding environment map 40, can also be said to be a position that conforms to the surrounding environment map 40. It can be said that the control unit 12 determines the holding position from among the positions that conform to the surrounding environment map 40.

The control unit 12 moves the approach position 70 to scan within the window 22 of the mask image 20 and rotates the end effector model 30 at each position to project it onto the surrounding environment map 40. The control unit 12 extracts the combinations of the approach position 70 and the rotation angle of the end effector model 30, in the case where the end effector model 30 can be projected onto the surrounding environment map 40.

Further, the control unit 12 calculates the coincidence degree in the surrounding environment map 40 for each combination of the approach position 70 and the rotation angle of the end effector model 30, in the case where the end effector model 30 can be projected. Specifically, the control unit 12 calculates the average value of the brightness of the numerical value or color set at each coordinate, in the surrounding environment map 40 illustrated in FIG. 10 in a range overlapping with the projection model 72*a* and outside the range of the object area 42, as the coincidence degree of the projection model 72*a*. The control unit 12 calculates the average value of the brightness of the numerical value or color set at each coordinate, in the surrounding environment map 40 illustrated in FIG. 10 in a range overlapping with the projection model 72*b* and outside the range of the object area 42, as the coincidence degree of the projection model 72*b*.

Figure 12A:
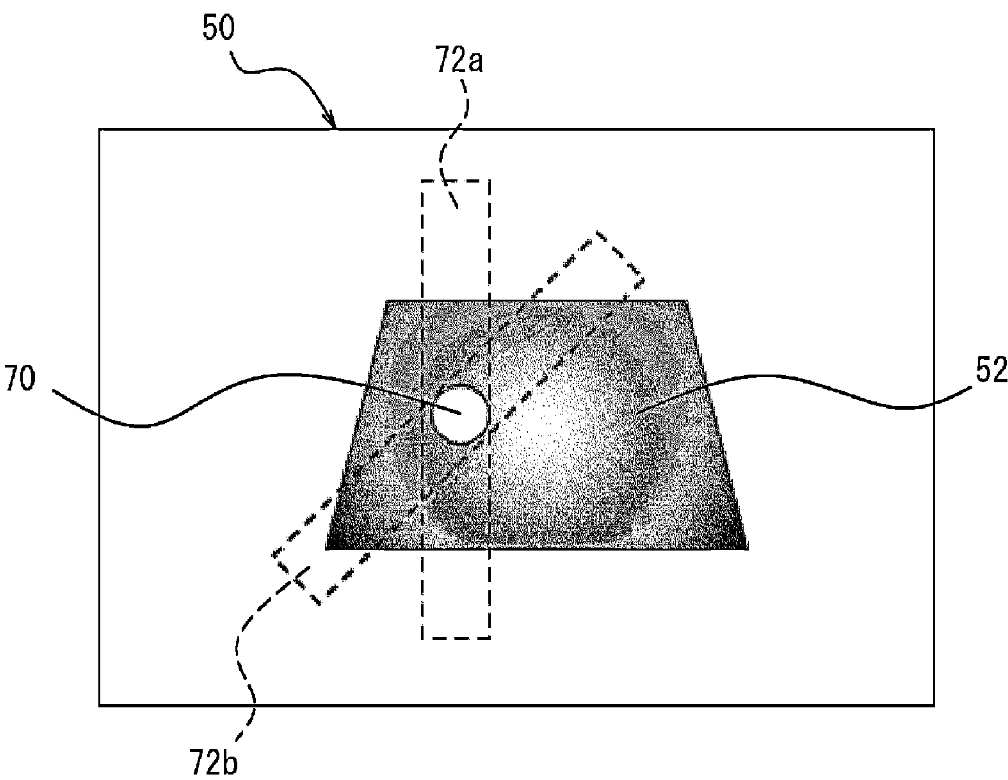
FIG. 12A is a view illustrating an example of a position where an end effector model is to be projected onto the object map.

The control unit 12 also projects the extracted combinations of the approach position 70 and the rotation angle of the end effector model 30 onto the object map 50. The control unit 12 projects the projection model 72*a* or 72*b* onto the object map 50, as illustrated in FIG. 12A, for example. The control unit 12 calculates the average value of the brightness values of the numerical value or color set at each coordinate, in a range overlapping with the window 22 of the mask image 20 in the object map 50 and overlapping with the projection model 72*a* in the cross section 52 of the holding target 80, as the coincidence degree of the projection model 72*a*. The control unit 12 calculates the average value of the brightness values of the numerical value or color set at each coordinate, in a range overlapping with the window 22 of the mask image 20 in the object map 50 and overlapping with the projection model 72*b* in the cross section 52 of the holding target 80, as the coincidence degree of the projection model 72*b*. In FIG. 12A, the black solid line surrounding the cross section 52 of the object map 50 simply represents the contour of the cross section 52. The coordinate plotted by the black solid line does not represent an inappropriate holding position.

The object map 50 represents the appropriateness as the position to hold the holding target 80. The position of the end effector 2B corresponding to the position and rotation angle of the end effector model 30 projected on the object map 50 can also be said to be a position that conforms to the object map 50. It can be said that the control unit 12 determines the holding position from among the positions that conform to the object map 50.

Figure 12B:
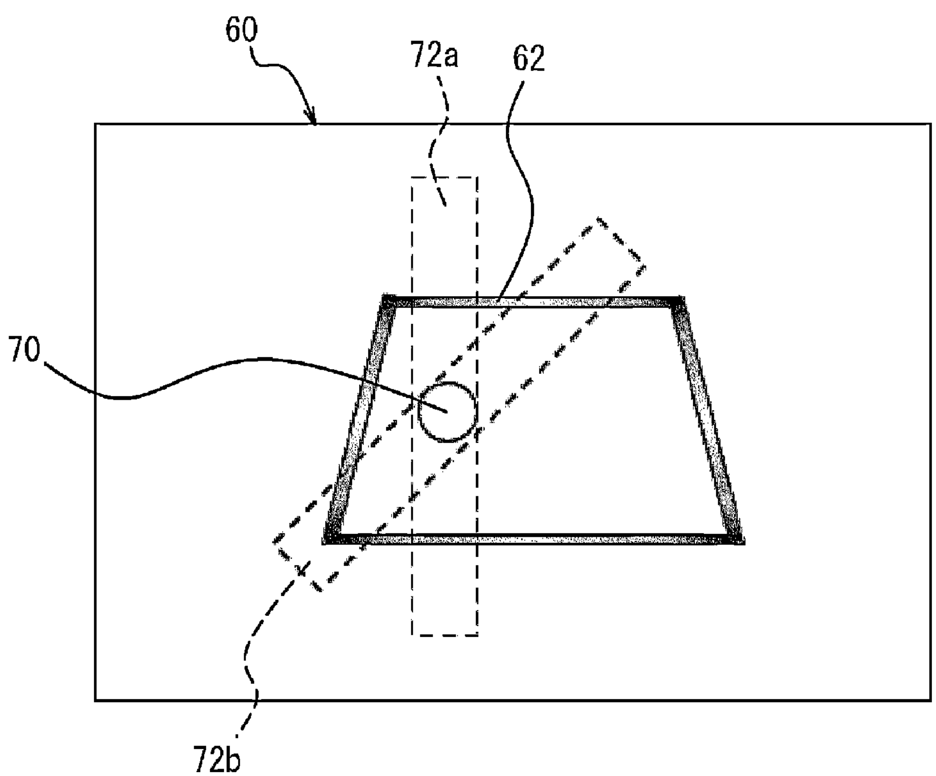
FIG. 12B is a view illustrating an example of a position where an end effector model is to be projected onto the contact map.

The control unit 12 also projects the extracted combinations of the approach position 70 and the rotation angle of the end effector model 30 onto the contact map 60. The control unit 12 projects the projection model 72*a* or 72*b* onto the contact map 60, for example, as illustrated in FIG. 12B. The control unit 12 calculates the average of the brightness values of the numerical value or color set at each coordinate of a range, in the outer periphery 62 of the cross section of the holding target 80 in the contact map 60, that overlaps with the projection model 72*a* as the coincidence degree of the projection model 72*a*. The control unit 12 calculates the average of the brightness values of the numerical value or color set at each coordinate of a range, in the outer periphery 62 of the cross section of the holding target 80 in the contact map 60, that overlaps with the projection model 72*b* as the coincidence degree of the projection model 72*b*. In FIG. 12B, the black solid line surrounding the outer periphery 62 of the contact map 60 simply represents the contour of the outer periphery 62. The coordinate plotted by the black solid line does not represent an inappropriate holding position.

The contact map 60 represents the appropriateness of the position of the contact portion of the end effector 2B with the holding target 80 as a position to contact with the holding target 80. It can be said that the control unit 12 determines the holding position from among a plurality of positions of the end effector 2B corresponding to the positions and rotation angles of a plurality of end effector models 30 projected on the contact map 60.

The control unit 12 may calculate the angle at which each of the two finger positions 32 of the end effector model 30 is made incident with respect to the outer periphery 62 along the direction of the stroke range 34. In other words, the control unit 12 may calculate the angle of intersection at each of the two intersections of the line along the direction of the stroke range 34 of the end effector model 30 and the outer periphery 62. In the present embodiment, the control unit 12 calculates an incident angle at which the finger position 32 is made incident perpendicular to the outer periphery 62 as 0 degrees. The control unit 12 may reflect the calculated angle in the contact map 60 to the value of the coincidence degree. The control unit 12 may calculate the angle so that the closer the angle is to 0 degrees, the value of the coincidence degree is calculated as a larger value. For example, the control unit 12 may calculate the product of the average of the brightness values of the numerical value or color set at each coordinate of a range, in the outer periphery 62 of the contact map 60, that overlaps with the projected end effector model 30 and the value of the cosine of the calculated angle as the coincidence degree.

If the outer periphery 62 is uneven, the control unit 12 may generate a flattened model of the outer periphery 62 based on the thickness, width or length of the fingers of the end effector 2B, and calculate the angle at which the finger position 32 is made incident on the flattened model.

The control unit 12 calculates an overall coincidence degree by adding up the coincidence degree calculated in each rule map for each combination of the approach position 70 and the rotation angle of the end effector model 30. The control unit 12 may perform weighting on the coincidence degree calculated in each rule map and add up the weighted coincidence degrees. The control unit 12 makes the weighting performed on the calculated coincidence degree in each rule map the same for all combinations. The coefficient of the weighting applied to the calculated coincidence degree in each rule map is also referred to as map coefficient. The map coefficient may be defined for each map.

As described above, the control unit 12 calculates the overall coincidence degree for each holding position based on the end effector model 30 and the rule map. The overall coincidence degree corresponds to an appropriate value that represents the appropriateness of each holding position. The rule map represents the appropriateness as a position to hold the holding target 80 as a holding position by the brightness value of the numerical value or color and the like assigned to each position (each coordinate) in the rule map. The control unit 12 can calculate the appropriate value by calculating the value assigned to each position when the end effector model 30 is overlapped with the rule map.

The control unit 12 compares the overall coincidence degree calculated for each combination of the approach position 70 and the rotation angle of the end effector model 30, and selects the combination with the highest overall coincidence degree. The control unit 12 determines the position at which the fingers of the end effector 2B are made incident to the holding target 80 when moving along the stroke direction, which is determined based on the approach position 70 and the rotation angle of the end effector model 30 in the selected combination, as the position to hold the holding target 80. In other words, the control unit 12 determines the holding position based on the end effector model 30 and the rule map. The control unit 12 may determine the holding position by, for example, estimating the holding position by comparing the end effector model 30 with the rule map and then adjusting or correcting the estimated holding position based on other rules. The control unit 12 may determine the holding position based on the appropriate value. The control unit 12 outputs the determined holding position to the robot control device 110 via the interface 14.

(Example of Procedure for Holding Position Determination Method)

Figure 13:
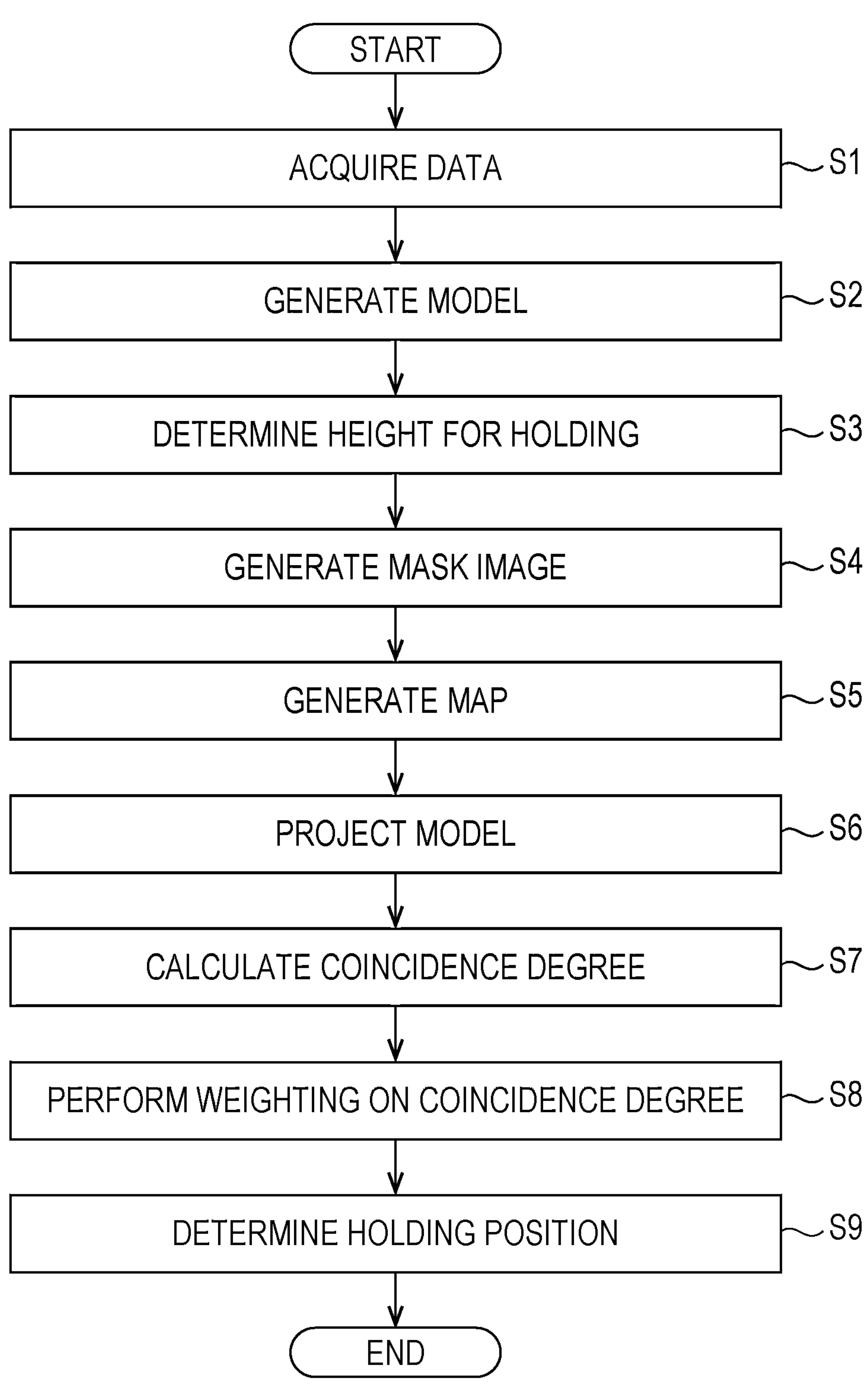
FIG. 13 is a flowchart illustrating an example of a procedure of a holding position determination method.

The control unit 12 of the holding position determination device 10 may perform a holding position determination method including the procedure of the flowchart illustrated in FIG. 13. The holding position determination method may be realized as a holding position determination program to be executed by a processor constituting the control unit 12 of the holding position determination device 10. The holding position determination program may be stored on a non-transitory computer readable medium.

The control unit 12 acquires data including an image obtained by photographing the holding target 80 and depth data of the holding target 80 (step S1). The control unit 12 generates the end effector model 30 (step S2). The control unit 12 determines the height of the position at which the holding target 80 is held (step S3). The control unit 12 generates the mask image 20 (step S4).

The control unit 12 generates a rule map such as the surrounding environment map 40, the object map 50 or the contact map 60 (step S5). The control unit 12 projects the end effector model 30 onto each rule map (step S6). The control unit 12 calculates the coincidence degree between each rule map and the end effector model 30 projected onto each rule map (step S7). The control unit 12 performs weighting on the coincidence degree calculated for each rule map to thereby calculate the overall coincidence degree. (step S8). The control unit 12 selects the projected position of the end effector model 30 when the overall coincidence degree is high, and determines the position at which the fingers of the end effector 2B are made incident to the holding target 80 at the selected position as the holding position (step S9). After executing the procedure of step S9, the control unit 12 terminates the execution of the procedure of the flowchart shown in FIG. 13.

The control unit 12 may perform the procedure of step S4, which generates the mask image 20, before steps S2 or S3.

SUMMARY

As described above, according to the holding position determination device 10 and the holding position determination method of the present embodiment, the holding position when holding the holding target 80 with the end effector 2B of the robot 2 is determined based on the rule map. By determining the holding position based on the rule map, the experience and the like of the worker can be reflected in the rule map. For example, when the worker holds various types of objects-to-be-helds 80, he or she considers which position to hold depending on the type of the objects-to-be-held 80. The worker determines the holding position by considering, for example, the center of gravity of the holding target 80, the obstacles existing around the holding target 80, or whether the position at which the holding target 80 is held is wide. In other words, according to the holding position determination device 10 and the holding position determination method of the present embodiment, the consideration of the worker is reflected in the rule map, the coincidence degree in each rule map is calculated, and the grasping position is determined based on the overall coincidence degree calculated by performing weighting on the coincidence degree. As a result, the robot 2 can hold the holding target 80 at the holding position considered by the worker. In other words, the holding position of an object can be simply determined in line with human intention.

In addition, the worker can use a rule map that rules the holding position. As a result, no learning is required. In addition, by adding a rule map when a new rule is made, it will be easier to respond to the change in the environment. For example, a work involving holding a holding target 80 can include various components according to the worker or the environment of the work site. Therefore, the holding position of the holding target 80 needs to be determined and held based on each component. By generating a rule map reflecting various components and adding it to the target of the coincidence degree calculation, it becomes easier to deal with special rules for each worker or each site.

OTHER EMBODIMENTS

Other embodiments are described below.

<Use of Estimation Results Based on Other Methods>

The holding position determination device 10 may acquire the holding position of the holding target 80 estimated based on other methods. The holding position determination device 10 may determine a holding position from among the acquired holding positions by performing the holding position determination method of the present embodiment on the acquired holding positions.

Specifically, the control unit 12 of the holding position determination device 10 acquires a holding position of the holding target 80 estimated based on other methods via the interface 14. The control unit 12 calculates the combination of the approach position 70 and the rotation angle of the end effector model 30 corresponding to the acquired holding position. The control unit 12 projects the end effector model 30 onto each rule map with the combination corresponding to the acquired holding position and calculates the coincidence degree in each rule map. The control unit 12 performs weighting on the coincidence degree in each rule map and adds up the weighted coincidence degrees to calculate an overall coincidence degree. The control unit 12 selects the holding position corresponding to the combination with the highest value of the overall coincidence degree and outputs it to the robot control device 110.

The holding position determination device 10 may evaluate the appropriateness of the holding position acquired by calculating the overall coincidence degree at the acquired holding position. The control unit 12 evaluates the validity of the acquired holding position based on the calculated overall coincidence degree. The control unit 12 may, for example, determine that the acquired holding position is valid when the calculated overall coincidence degree is equal to or greater than a predetermined value.

The holding position determination device 10 may acquire the center position and rotation angle of the end effector 2B estimated based on other methods. The holding position determination device 10 can calculate the combination of the approach position 70 and the rotation angle by regarding the acquired center position of the end effector 2B as the approach position 70, and perform the holding position determination method according to the present embodiment.

By acquiring the holding position of the holding target 80 estimated based on other methods, the holding position determination device 10 can reduce the number of combinations of the approach position 70 and the rotation angle, as the targets of the coincidence degree calculation. As a result, calculation load can be reduced.

<Adjustment of Weighting by Learning>

The holding position determination device 10 calculates the overall coincidence degree by performing weighting on the coincidence degree calculated for each rule map and adding up the weighted coincidence degrees. The holding position determination device 10 may update the coefficient of weighting by learning based on information on annotation for the determined holding position. The holding position determination device 10 can improve the accuracy of determining the holding position by updating the coefficient of weighting.

Specifically, the control unit 12 of the holding position determination device 10 may notify the user of the determined holding position by the interface 14. By the interface 14, the control unit 12 receives, from the user, input to correct the holding position as the annotation for the determined holding position. The control unit 12 may output the corrected holding position to the robot control device 110 based on the information on the correction made by the user. The control unit 12 may update the coefficient of weighting and redo the determination of the holding position by learning based on the information on the correction made by the user.

The control unit 12 may determine a plurality of candidates of the holding position and notify the user of the determined candidates by interface 14. The control unit 12 may determine, as the candidates, the holding positions for which the overall coincidence degree is equal to or greater than a predetermined value. By the interface 14, the control unit 12 receives, from the user, input to select from the candidates of the holding position as the annotation for the determined holding position. The control unit 12 may output the holding position selected by the user to the robot control device 110. The control unit 12 may update the coefficient of weighting by learning based on the information selected by the user.

The control unit 12 may extract the holding positions where the overall coincidence degree is equal to or greater than a predetermined value as candidate positions where the holding target 80 can be held, and notify the user of the extracted candidate positions. By the interface 14, the control unit 12 receives, from the user, input to correct the candidate positions or input to select candidate positions as annotations for the candidate positions. The control unit 12 evaluates the appropriateness of each candidate position based on the correction or selection input for the candidate position. The control unit 12 may update the coefficient of weighting so that the value of the overall coincidence degree becomes large for candidate positions evaluated as having high appropriateness as the holding position based on the input of the user. The control unit 12 may output the selected candidate positions to the robot control device 110 as the holding position. The control unit 12 may output the corrected candidate positions to the robot control device 110 as the holding position.

Figure 14:
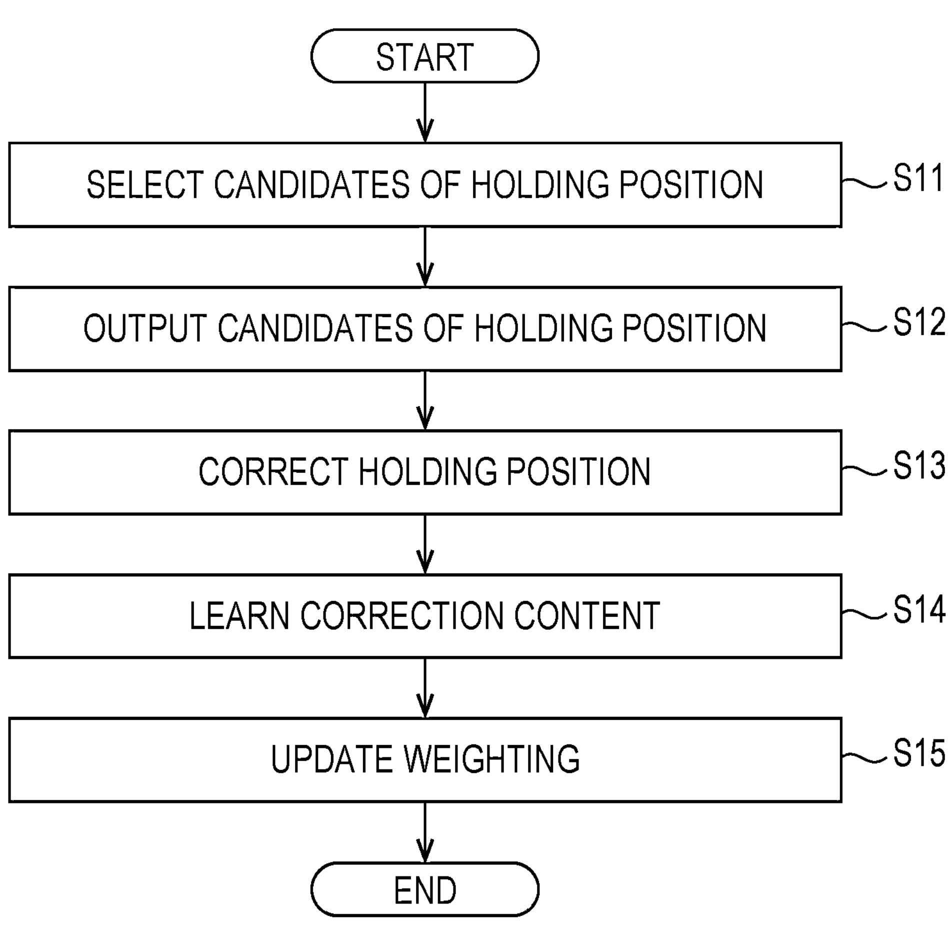
FIG. 14 is a flowchart illustrating an example of a procedure to correct and learn a holding position determined by the holding position determination method of FIG. 13.

The control unit 12 of the holding position determination device 10 may execute the procedure of the flowchart shown in FIG. 14. The control unit 12 selects candidates of the holding position (step S11), for example, by executing the procedure of the flowchart shown in FIG. 13. The control unit 12 outputs the candidates of the holding position to the interface 14 (step S12). The control unit 12 corrects the holding position based on the input of the correction made by the user (step S13). The control unit 12 learns the correction content (step S14). The control unit 12 updates the weighting based on the learning results (step S15). After executing the procedure in step S15, the control unit 12 terminates the execution of the procedure of the flowchart shown in FIG. 14.

As described above, the holding position determination device 10 can update the weighting based on the content of the annotation made by the user. As a result, robustness to various work environments can be improved.

The holding position determination device 10 performs weighting on each of a plurality of maps and mixes the weighted maps to generate a rule map. For example, the holding position determination device 10 mixes a plurality of object maps 50 to generate a single object map 50. In the case of performing weighting on each of a plurality of maps and mixing the weighted maps, the holding position determination device 10 may update the weighting coefficient for each map by learning based on annotations.

The holding position determination device 10 may acquire information on annotations for a plurality of holding positions and correct the appropriate value based on the information on annotations.

<Generation of Map Based on Image>

The holding position determination device 10 may generate a rule map based on an image photographed by the camera 4. The control unit 12 of the holding position determination device 10 may, for example, estimate the center of gravity of the holding target 80 based on the image and generate an object map 50 that identifies the position of the center of gravity. The control unit 12 may, for example, estimate the material of the holding target 80 based on the image and generate a contact map 60 that identifies the friction force acting between the surface of the holding target 80 and the fingers of the end effector 2B. The control unit 12 may estimate the material of the holding target 80 based on information about the color, pattern or unevenness of the holding target 80.

<Height Setting of Holding Position>

The holding position determination device 10 first sets the height of the position at which the holding target 80 is to be held, and then determines the holding position at the set height. The holding position determination device 10 may change the height of the position at which the holding target 80 is held, perform the holding position determination method at each height, and determine the height of holding and the combination of the approach position 70 and rotation angle of the end effector 2B when the value of the overall coincidence degree is the greatest as the holding position. Thus, holding stability can be improved.

The embodiments of a holding position determination device 10 have been described above; however, the present disclosure may include an embodiment that includes a storage medium (for example, an optical disk, a magneto-optical disk, a CD-ROM, a CD-R, a CD-RW, a magnetic tape, a hard disk, or a memory card) having a program stored therein, in addition to the method or program for implementing the device.

The program implementation mode is not limited to an application program such as an object code compiled by a compiler or a program code executed by an interpreter, and may be, for example, a program module incorporated in the operating system. Further, the program may or may not be executed entirely only in a CPU in a control substrate. The program may be executed partially or entirely by a separate processing unit implemented in an extension board or extension unit added to the substrate, according to necessity.

Although the embodiments pertaining to the present disclosure have been described based on the drawings and examples, it should be noted that a person skilled in the art can easily make various changes or modifications based on the present disclosure. Thus, it should be noted that these variations or modifications are included within the scope of the present disclosure. For example, the function and the like included in each component or the like can be rearranged so as not to be logically inconsistent, and a plurality of components or the like can be combined into one or divided.

All the components described in the present disclosure and/or all the disclosed methods or all the processing steps may be combined based on any combination except for the combination where these features are exclusive with each other. Further, each of the features described in the present disclosure may be replaced with an alternative feature for achieving the same purpose, equivalent purpose, or similar purpose, unless explicitly denied. Therefore, each of the disclosed features is merely an example of a comprehensive series of identical or equal features, unless explicitly denied.

The embodiments according to the present disclosure are not limited to any of the specific configurations in the embodiments described above. The embodiments according to the present disclosure can be extended to all the novel features described in the present disclosure or a combination thereof, or to all the novel methods described in the present disclosure, the processing steps, or a combination thereof.

The descriptions such as "first" and "second" in the present disclosure are identifiers for distinguishing corresponding configurations. Configurations distinguished by the descriptions such as "first" and "second" in the disclosure can exchange numbers in the corresponding configurations. For example, the first area can exchange "first" and "second", which are identifiers, with the second area. The exchange of identifiers takes place at the same time. Even after exchanging identifiers, the corresponding configuration is distinguished. The identifier may be deleted. The configuration with the identifier deleted is distinguished by a reference sign. It should not be used as a basis for interpreting the order of the corresponding configurations and the existence of identifiers with lower numbers, based on the description of identifiers such as "first" and "second" in this disclosure.

REFERENCE SIGNS

- 10 holding position determination device (12: control unit, 14: interface)
- 20 mask image (22: window, 24: mask)
- 30 end effector model (32: finger position, 34: stroke range, 36: finger movement range, 38: out-of-movement range)
- 40 surrounding environment map (42: object area, 44: obstacle area, 46: approach area, 46*a*: boundary, 48: non-approach area)
- 50 object map (52: cross section)
- 60 contact map (62: outer periphery)
- 70 approach position
- 72*a*, 72*b*, 72*c* projection model
- 74*a*, 74*c* finger projection position
- 80 holding target (82: holding point)
- 100 robot control system (2: robot, 2A: arm, 2B: end effector, 4: camera, 5: movement range of robot, 6: work start platform, 7: work target platform, 110: robot control device)

The invention claimed is:

1. A holding position determination device comprising: at least one processor a control unit configured to determine a position where an end effector, including two or more fingers, adapted to hold a holding target contacts the holding target holding position, the at least one processor control unit further configured to acquire an end effector model that includes a stroke model that identifies a stroke range which represents a maximum opening width of the fingers identifies an area where a holding portion of the end effector can exist, acquire a rule map that includes a map defining the position of the holding target to be held by the end effector based on an image of holding target obtained by photographing the holding target, wherein the rule map includes a surrounding environment map that identifies an object area, which represents an area where the holding target exists at a height of the position at which the holding target is held, project the end effector model, as a temporary holding position of the holding target, onto the rule map, and determine that the end effector model cannot be projected when a position of one of the fingers overlaps the object area, determine the holding position based on the end effector model and the rule map, and generate control signals to actuate the end effector at the holding position to physically grasp the holding target and move the holding target from a work start platform to a work target platform.

2. The holding position determination device according to claim 1, wherein the at least one processor is further configured to acquire the rule map based on at least one of shape data of the holding target and/or depth data associated with the image of the holding target.

3. The holding position determination device according to claim 1, wherein the rule map includes a height map generated based on the position of the holding target in the height direction at which the holding target is to be held.

4. The holding position determination device according to claim 1, wherein the at least one processor is further configured to;

calculate an appropriate value representing appropriateness of holding position for a plurality of holding positions based on the end effector model and the rule map, and determine the holding position based on the appropriate value.

5. The holding position determination device according to claim 4, wherein the end effector model and the rule map are represented by values assigned to each position that indicate appropriateness as the position for holding the holding target, and the at least one processor is further configured to calculate the appropriate value by calculating the values assigned to the each position when the end effector model is overlapped with the rule map.

6. The holding position determination device according to claim 4, wherein the rule map comprises a plurality of different types of maps, and the at least one processor is further configured to calculate the appropriate value based on the plurality of maps included in the rule map and a map coefficient determined for each map of the plurality of maps.

7. The holding position determination device according to claim 1, wherein
the at least one processor is further configured to:
acquire information on annotations for a plurality of holding positions and
correct an appropriate value based on the information on annotations.

8. The holding position determination device according to claim 1, wherein
the rule map includes a surrounding environment map that defines a range in which the end effector can move when the end effector holds the holding target, and
the at least one processor is further configured to determine the holding position from a plurality of positions of the end effector that conforms to the surrounding environment map.

9. The holding position determination device according to claim 8, wherein
in the surrounding environment map, a first area in which the end effector can exist and a second area in which the end effector cannot exist are defined, and
the second area is defined as at least the holding target and/or a surrounding area of the holding target, and in the surrounding area, the second area is assigned such that the proportion of the second area in the first area decreases as separating from the holding target.

10. The holding position determination device according to claim 1, wherein
the rule map includes an object map representing appropriateness of positions for the holding target, and
the at least one processor is further configured to determine the holding position from a plurality of positions of the end effector that conforms to the object map.

11. The holding position determination device according to claim 10, wherein the object map is defined based on properties possessed by the holding target.

12. The holding position determination device of claim 11, wherein the object map is defined based on at least one of the shape, material, texture, weight, and/or friction coefficient of the holding target.

13. The holding position determination device according to claim 1, wherein
the rule map includes a contact map representing appropriateness of a position of a contact portion of the end effector with the holding target as a position to contact the holding target, and
the at least one processor is further configured to determine the holding position from a plurality of positions of the end effector relative to the contact map.

14. The holding position determination device according to claim 13, wherein the contact map is defined based on a shape of the contact portion of the end effector with the holding target and a shape of the holding target.

15. The holding position determination device according to claim 1, wherein
the end effector is a gripper that grasps the holding target by sandwiching it between at least two fingers,
the end effector model defines a movement range of the fingers, and
the at least one processor is further configured to determine a combination of positions where the fingers contact the holding target when the gripper grasps the holding target as the holding position.

16. The holding position determination device according to claim 1, wherein
the end effector includes a suction portion that holds the holding target by suction,
the end effector model defines a range in which the suction portion interferes with other objects when the end effector sucks the holding target, and
the at least one processor is further configured to determine the position where the suction portion contacts the holding target when the end effector sucks the holding target as the holding position.

17. The holding position determination device according to claim 1, wherein the at least one processor is further configured to:
acquire an image and depth data of the holding target obtained by photographing the holding target,
generate a mask image representing an outline of the holding target based on the image and depth data,
generate the rule map comprising a plurality of different types of maps based on the mask image.

18. A holding position determination method, comprising: acquiring, by a holding position determination device that determines the position where an end effector, including two or more fingers, adapted to hold a holding target contacts the holding target at a holding position, an end effector model that includes a stroke model that identifies a stroke range which represents a maximum opening width of the fingers identifies an area where a holding portion of the end effector can exist; ac quiring, by the holding position determination device, a rule map that includes a map defining the position of the holding target to be held by the end effector based on an image of holding target obtained by photographing the holding target, wherein the rule map includes a surrounding environment map that identifies an object area, which represents an area where the holding target exists at a height of the position at which the holding target is held, projecting the end effector model, as a temporary holding position of the holding target, onto the rule map, and determining that the end effector model cannot be projected when a position of one of the fingers overlaps the object area; determining, by the holding position determination device, the holding position based on the end effector model and the rule map, and generating control signals to actuate the end effector at the holding position to physically grasp the holding target and move the holding target from a work start platform to a work target platform.

19. A holding position determination device comprising:
at least one processor configured to:
determine a position where an end effector adapted to hold a holding target contacts the holding target as a holding position,
acquire an end effector model that identifies an area where a holding portion of the end effector can exist,
acquire a rule map comprising a plurality of different types of maps that includes a first map defining the position of the holding target to be held by the end effector based on an image of holding target obtained by photographing the holding target,
calculate an appropriate value representing appropriateness of holding position for a plurality of holding positions based on the plurality of different types of maps included in the rule map and a map coefficient determined for each map of the plurality of different types of maps,
determine the holding position based on the appropriate value, and
generate control signals to actuate the end effector at the holding position to physically grasp the holding target and move the holding target from a work start platform to a work target platform.

* * * * *